Oct. 18, 1966 D. H. GIESKIENG 3,280,328
APPARATUS SIGNALING DENSITY OF BULK MATERIAL
Filed July 1, 1963
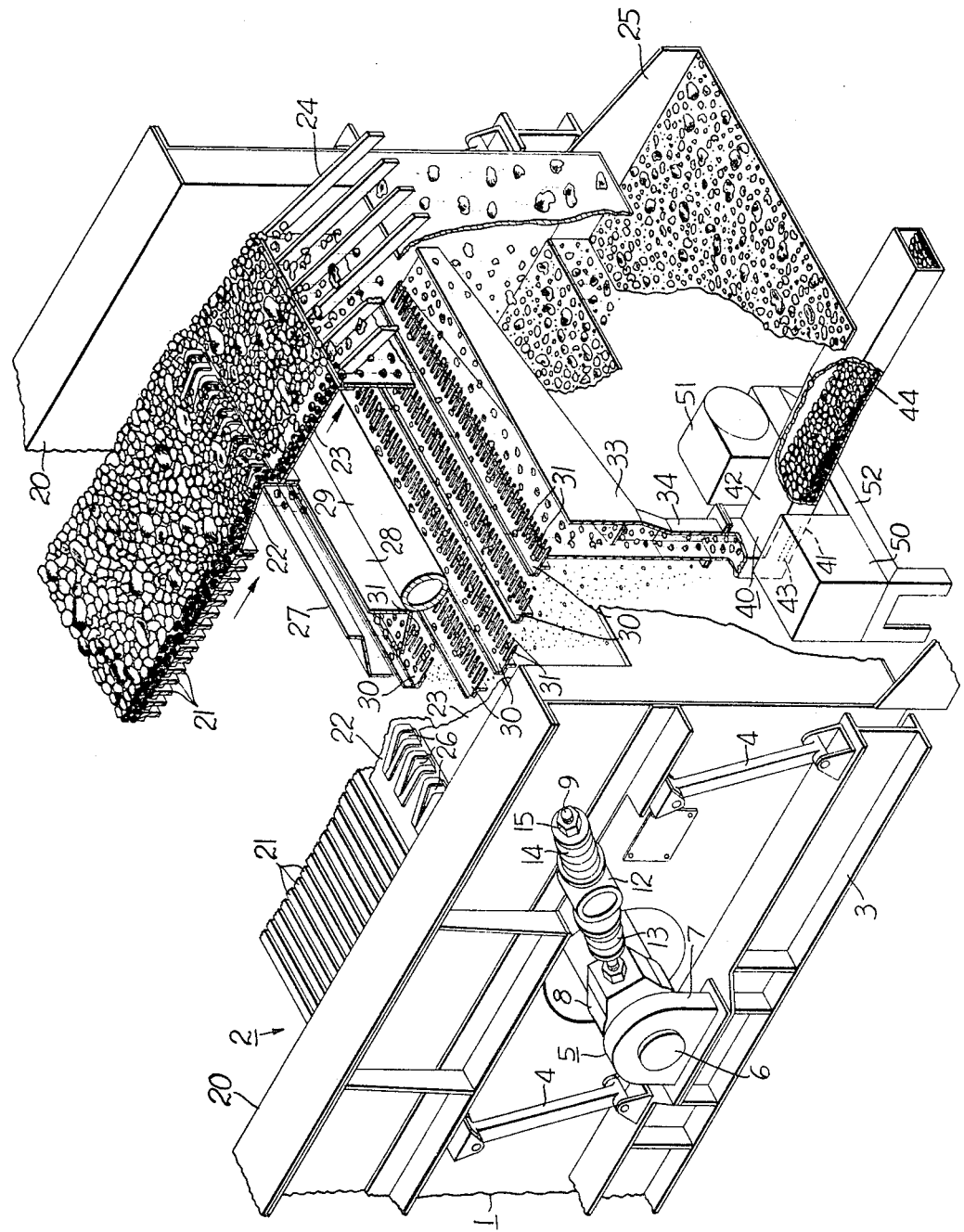
Inventor
David H. Gieskieng
By Arthur M. Struck
Attorney

United States Patent Office 3,280,328
Patented Oct. 18, 1966

3,280,328
APPARATUS SIGNALING DENSITY OF
BULK MATERIAL
David H. Gieskieng, West Allis, Wis., assignor to Allis-Chalmers Manufacturing Company, Milwaukee, Wis.
Filed July 1, 1963, Ser. No. 291,859
4 Claims. (Cl. 250—83.3)

This invention relates to the technology of burning mineral ores, as for example burning limestone to produce Portland cement clinker. More particularly, the invention relates to a method and apparatus for producing an operational signal indicative of the degree of burn of minerals having bulk densities that change as a result of the burn, with such signal being of a type that can be used as a control signal for automating the burning operation.

Since about the year 1890 a substantial number of Portland cement producers have manually controlled the burning operation guided by a manual determination of the weight of one liter of cement clinker. The technique involves taking a sample of clinker after it has cooled sufficiently to handle, then screening the clinker to obtain a sample of relatively uniform size particles which are then placed in one liter container and weighed. This manual test is usually made hourly but is, of course, time consuming and therefore cannot provide a basis for close regulation of the various factors that influence the burning operation. Furthermore, unless great care is taken in screening the clinker sample and uniformly packing the weighing container, errors in excess of 25% of the usable literweight span can commonly occur. The usefulness of a literweight test can be measured indirectly by comparing results with results obtained by testing to determine the percentage of uncombined lime in the clinker. However, despite the difficulties involved with the literweight test it is at least a quicker determination than testing for uncombined lime. Reliance upon the literweight technique grew and in 1939 the Manufacturing Research Bureau of the Portland Cement Association published the results of evaluation study entitled "The Literweight Test as a Rapid Method for Judging Clinker Burning." This study reported advantages of test that included findings that "The weight per liter is a fairly reliable index of the degree of burning . . . . There appears to be a fairly direct relation between clinker weight and the structure, grindability, mortar strength, and other physical properties which are affected by the degree of burning . . . . Too hard burning ('overburning') can be detected by the literweight tests."

Objects accomplished by the present invention include providing new and improved control signal concepts for guiding or automating a burning operation, while providing such a signal continuously and with new speed, accuracy and uniformity of results.

The nature of the present invention resides in the manner in which a continuous sample of material is passed before a radioactive ray beam, preferably gamma ray, with the beam aimed at a ray density gauge, for measuring rays not absorbed by the material. While voids between particles of material will, of course, pass some rays that have gone through less of the material than other rays go through, the present invention provides for achieving uniformity of the ratio of voids to solids so that the ratio is a relative constant in terms of an effect on the signal produced, and as a constant can be allowed for by adjusting the calibration of indicators or other responding devices. If desired, the signal can also be gated so it is read or responded to only during the interval between shakes, when for a brief instant all material is at rest.

In a preferred embodiment of the invention burned material is caused to cascade down and over a series of screening devices to continuously prepare a sample having about a 3 to 1 ratio of particle sizes. That is, the smallest pieces are at least about one-third the size of the largest; or the same range may be stated as having largest pieces no more than three times the size of the smallest pieces. Such pieces are then channeled along an upward incline and shaken to advance pieces along and up the inclined. This approach provides a pocket of material near the lower end of the incline that provides a suitable consistent target for X-rays or gamma rays. Discharge from the pocket along an incline of sufficient slope will insure a minimum depth of material in the pocket before essentially any material shakes out and therefore insures that material will fill the target space for all practical purposes. If the rate of feed to the pocket is irregular, the rate discharged will correspond because the pocket material is moved essentially by displacement by new material. Thus variation in feed rates will affect the conveying rate through the pocket and thereby adapt to this factor. Eliminating the possibility of the beam passing through an empty or partly empty target space eliminates misleading signals. Further, stability of operation is provided for in the preferred embodiment by providing a cover over the first part of the inclined trough and a chute feeding the first part of the pocket.

The aforementioned features of the present invention and how they accomplish the previously stated and other obvious objects of the invention wil be described in greater detail with reference to the drawing. The drawing is a perspective view, partly in section and with certain structure broken away to show how the present invention may be applied to one illustrative type of cooler used in mineral burning operations.

Referring to the drawing, a portion of the discharge end of an air quenching cooler 1 is shown which may be of the type shown and described in U.S. Patent 2,103,170. The cooler 1 is provided with a grate assembly 2 mounted in vertically spaced arrangement above stationary foundation structure 3. The entire grate assembly 2 is mounted for oscillating movement on upstanding rearwardly inclined links 4. A mechanism 5 both prevents collapse of the links 4 and also imparts movement to the grate assembly 2. The mechanism 5 includes a shaft 6 journaled in bearings 7 carried by the stationary foundation member 3. The shaft 6 has an eccentric portion (not shown) journaled in a yoke 8. A shaft 9 projects upwardly of the yoke 8 along an axis inclined forwardly and projects through a collar 12 attached to the grate assembly 2. Springs 13 and 14 are mounted around shaft 9 with one on each side of the collar 12. Spring 13 prevents collapse of the links 4 and spring 13 cushions the upward throw of the mechanism against stop nut 15 turned on to the end of shaft 9. Other links and springs may be arranged in the manner shown in the aforementioned Patent 2,103,170.

The grate assembly includes a pair of side wall members 20 and a plurality of crossbars 21 that span the distance between side wall members 20. The bars 21 are slightly spaced from each other to permit cooling air to pass upwardly through the spaces between the bars. Material advances along the grate assembly atop the bars 21 in the direction indicated by the arrows and is delivered to a primary screen 22 having a construction and a purpose that will be described in greater detail as the description of the invention proceeds. Material passing over the primary screen 22, however, continues in the direction indicated by the arrows and passes over a deck 23. Deck 23 may be a flat impervious deck as shown in the drawing. Material passing over deck 23 is then discharged over a grizzly assembly 24 which screens out oversized pieces of clinker and usually delivers them to a clinker breaker (not shown) while material small enough to pass between the bars of the grizzly falls down to a collecting trough 25 for further conveyance.

The primary screen 22 defines openings 26 that diverge in the direction of material movement in order to be self-cleaning and eliminate binding or jamming of pieces of clinker in the openings. By diverging in the direction of material flow, a particle that might temporarily become wedged between the edges defining openings 26 will be pushed by material following and urged in the direction of the widening opening thus eventually either passing through the opening or continuing on over deck 23. In addition to the diverging configuration of openings 26, the primary screen 22 is also inclined upwardly in the direction of material flow. This also aids in the self-cleaning action of material passing over openings 26 because in addition to the openings becoming wider in the direction of material flow the space slope provides progressively more head room so the end of the slot 26 provides nonclogging free discharge of the material. The upward incline of the primary screen 22 in the direction of material flow also acts as a uniform impediment and provides a stabilizing restraint on the flow of clinker that provides a more uniform depth of the clinker bed along the entire length of the cooler. Since it is preferred to have the primary screen near the discharge end of the cooler in order to screen out relatively cool material, such a depth stabilizing effect provides for uniform depth along substantially the entire length of the cooler. The incline serves still another purpose and achieves still another advantage in that the incline serves as an impediment to material bow which in turn requires somewhat more vigorous conveying action to get material over the primary screen and in the course of achieving this flow over the primary screen a better distribution of clinker pieces is achieved along the entire length of the cooler.

A deflection plate 27 is arranged below primary screen 22 to deflect smaller particles which pass through the narrowest portion of the V-shaped openings 26, away from a collection plate 28. Collection plate 28 is shown carried by a transverse support member 29 that extends between side wall members 20. Collection plate 28 therefore collects the relatively larger size pieces that pass through opening 26 while deflection plate 27 deflects some of the fine material passing through openings 26 away from the collection plate and thus to some small extent simplifies further screening operations. The bottom of collection plate 28 slopes downwardly in the direction counter to the direction of material over bars 21. Material dropping off the sloped bottom of collection plate 28 falls upon a first of several stages of rescreen elements 30. Material will cascade downwardly over the rescreen elements 30 once again in the same direction as indicated for material passage over bars 21. As the material passes over each of the rescreen elements, the smaller particles fall between fingers 31 on each element while larger pieces are supported by adjacent pairs of fingers and dropped to the next lower of the rescreen elements. This rescreening procedure may be repeated several times until the desired distribution of sizes is achieved. Such screened and rescreened material is then dropped into an inclined trough 33 from which the material pours downwardly into a vertical chute 34. From chute 34 the screened material passes through an inspection station where its bulk density is continuously measured in a manner and by equipment that will now be described.

The screened material is deposited in a channel 40 having a bottom 41 inclined upwardly in the direction of material travel. At least the first part of the channel 40 downstream of chute 34 is covered by a roof 42. Primary screen 22, the rescreen elements 30, the trough 33, chute 34 and channel 40 are all connected to and shake with the entire grate assembly 2. Thus the same shaking action that advances material along the tops of grate bars 21 also advances material through channel 40. The upwardly inclined bottom 41 of channel 40 provides for a pocket of material near the lower end of the incline that provides a suitable target space 43 for radioactive rays such as X-rays or gamma rays. The target area 43 is spaced slightly above the bottom surface 41 so that any fines that do find their way through the rescreening elements to the trough 33 will pass beneath the target space 43. Bottom surface 41 is provided with sufficient slope, for example, about 7 degrees. Such a slope provides a minimum depth of material in the lower end of channel 40 that insures that material deposited in the channel will fill the channel to a level above the target space 43. The minimum level in channel 40 above target space 43 will be maintained even if the rate of feed to the lower end of channel 40 is irregular because the discharge rate from channel 40 will correspond to the rate of feed to it. This balance is achieved because the lower end of channel 40 is a pocket filled with material which is moved essentially by displacement, that is when channel 40 shakes its contents upward and forward the return stroke downwardly to the rear opens up a space behind the charge of material in channel 40 into which other material from chute 34 can fall and on the next forward and upward stroke act to push material ahead of it up the slope of bottom surface 41 to be discharged over the top of the incline to a surface 44. If material does not for some short period descend through chute 34 to fill such a space and displace such material, then the material within channel 40 slides backward into that space and little or no material is discharged from sloped bottom surface 41 to surface 44. Thus collecting material in a space from which it can escape only by moving up inclined surface 41 will insure the depth of material near the lower end of the incline will be maintained above the level of the target space 43 and therefore eliminate the possibility of the beam passing through an empty or partly empty target space to give misleading signals.

The bulk density of the material passing through the target space 43 is determined by aiming such as a gamma ray beam from an isotope source holder 50 through the target space 43, and at a density gauge detector 51 placed on the opposite side of chanel 40. Both isotope source holder 50 and density gauge detector 51 may be mounted on such as a tablelike support 52 for supporting them in the positions described.

The isotope source holder 50 is commercially available equipment, fos example, a gamma ray radiation source such as cesium 137 in a sealed source marketed by the Ohmart Corporation of Cincinnati, Ohio, and identified as model DWG A2096 LAB-713(S)-D, the sealed source being mounted within a source holder such as an Ohmart model SHRM-PA, and the source holder in turn being mounted in such as an Ohmart collimator model DWG-C-3859. The density gauge detector 51 may be an ion cell gamma radiation detector marketed by Ohmart Corporation as part #18-1169 and held in a collimating bracket Ohmart model DWG-C-3858. The amount of gamma radiation from isotope source holder 50 which impinges upon density gauge detector 51 depends upon the density of the clinker passing through the target space 43. The detector aperture is designed to make the detector essentially responsive only to the target space 43, avoiding responding to the bottom of the sensing pocket which may contain some fines carried over the rescreen elements which could vary the desired natural packing void percentage (approximately 40%) and avoids the top of the pocket, the voids of which may vary slightly due to changes of conveying agitation or quantity of material supplied to the sensing chamber. An alternative approach would be to restrict the size of the detector element to correspond to the size and shape of the target area. Density gauge detector 51, of the type described, is adapted to respond to the amount of radiation impinging thereon to generate an electrical output signal which is proportional thereto. This electric signal may be fed to a signal amplifier (not shown) which is adapted to amplify the signal output which may then be fed to a recorder or operational control devices none of which are herein shown but which are described in U.S. Patent 3,075,756.

In the operation of the described apparatus to perform the method according to the present invention, material is discharged on top of grate bars 21 of the grate assembly 2 from a furnace (not shown) which may be such as a cement burning kiln charged with suitable quantities of finely ground and blended limestone, natural carriers of $SiO_2$ and $Al_2O_3$ such as clay or shale and natural carriers of $Fe_2O_3$ such as hematite or mill scale. Such materials when burned undergo chemical changes to convert the raw material to hot cement clinker which is to be cooled on the grate bars 21. Such material will be deposited on top of grate bars 21 at a temperature of about 2400° F. and usually in a layer about four inches deep. Air is blown upwardly through the spaces between grate bars 21 and up through the material on top of the grate bars to cool the material. The material carried by the grate assembly 2 is moved in the direction shown by the arrows as the result of the entire grate assembly being shaken by the mechanism 5.

When the material carried by the grate assembly reaches the primary screen 22 some of the material will move up and over the incline of screen 22 and pass on to deck 23 to be discharged either over or through the grizzlies 24. Other material not passing over deck 23 will drop through the openings 26. Deflector plate 27 will deflect some of the smaller pieces passing through the openings 26 while larger pieces and some fines will fall through the opening upon collection plate 28. From collection plate 28 the material will cascade down the plurality of rescreen elements 30 until the material finally reaching trough 33 will have been sized to a size ratio of about 2 to 1. The material collected in trough 33 will slide down the incline thereof into chute 34 that feeds this material to the lower end of channel 40. Material passes through channel 40 upwardly along the inclined bottom surface 41 through the target space 43 to determine the bulk density in the manner that has been described. From channel 40 the material passes to the level 44 from which the material may be once again mixed with clinker collected by the trough 25. In the embodiment shown, the entire assembly of the primary screen 22, rescreen elements 30, the trough 33, chute 34 and channel 40 are all connected to the grate assembly 2 and shake along with the assembly 2 to advance material through channel 40 in the same manner and direction that the material is advanced along the tops of the grate bars 21.

An important feature of the invention resides in the sensing chamber 40 having an upward slope which slots a sample of sufficiently uniform consistency to permit direct bulk density gauging by the isotope source 50 and detector 51. Without this inclination, it was found necessary to not only provide sufficient sample at all times to occupy the target space, but to also either gate the detector so that it would be responsive only during the brief period when the conveying platform was first rising in each of its oscillation cycles, or to compensate the density cell signal according to the conveying agitation forces involved at any time on the basis that the additional voids between the particles were essentially a function of the agitation forces shaking the material.

The equipment required for gating or compensating the signal is fairly complex and providing an incline 41 avoids the need to gate or compensate while giving good results with less and varying quantities of sampled material.

From the foregoing it can be seen that the present invention has accomplished the identified and described objects and thereby and thereby made significant and important advances in this art. By the present invention a single signal indicates the degree of burn of a material having the characteristic of a changing density as a result of burning. While the present invention has been described primarily in connection with a cooler for cooling cement clinker, and cement raw material is a material that generally achieves greater density when it is burned, the invention can be advantageously applied to any material having a change in its density during a treatment process whereby the density of the material indicates the degree to which the treatment has progressed. Many variations will perhaps occur to those skilled in the art that will be within the spirit of the inventions that have been herein described. It is therefore intended that the inventions described should be limited only as defined in the appended claims.

The embodiments of the invention in which an exclusive property or privilege is claimed are defined as follows:

1. An apparatus for producing a signal indicative of the density of a mix of random size particles of bulk material comprising,
   means channeling a flow of screened material along an upward incline and establishing on the incline a layer of material having a predetermined width and at least a predetermined minimum level providing a depth which on the lower end of the incline is deeper than the depth of material on the upper end thereof,
   means connected to the channeling means for shaking the material to advance material up said incline to be discharged at a level above the bottom of the incline while maintaining said minimum level and depth,
   means supported adjacent one side of the channeling means for aiming a radioactive ray beam at the material between the incline and said minimum level at a location nearer the lower end than the upper end thereof, and
   means supported adjacent the side of said channeling means opposite the aiming means for measuring the unabsorbed radioactive rays passing through the material with a radioactive ray density gauge whereby the density of radioactive rays signaled by the gauge provide a measure of the bulk density of the material.

2. An apparatus for producing a signal indicative of the density achieved by heating a mix of random size particles of Portland cement raw materials comprising,
   means for cooling the material below the temperature of incipient fusion,
   means connected to the cooling means for receiving material therefrom and screening the material to collect a sample comprising a size range in which the smallest pieces are essentially at least about one-third the size of the largest pieces,
   means connected to the screening means for channeling a flow of screened material along an upward incline and establishing on the incline a layer of material having a predetermined width and at least a predetermined minimum level providing a depth which on the lower end of the incline is deeper than the depth of material on the upper end thereof,
   means connected to the channeling means for shaking the material to advance material up said incline to be discharged at a level above the bottom of the incline while maintaining said minimum level and depth,
   means supported adjacent one side of the channeling means for aiming a gamma ray beam at the material between the incline and said minimum level at a location nearer the lower end than the upper end thereof, and
   means supported adjacent the side of the channeling means opposite said aiming means for measuring the unabsorbed gamma rays passing through the material with a gamma ray density gauge whereby the density of gamma rays signaled by the gauge provide a continuous measure of the bulk density of the material.

3. An apparatus for producing a signal indicative of the density of a mix of random size particles of bulk material comprising, an upwardly inclined channel having a roof over at least a portion of the channel nearer to the lower end than the upper end for containing a layer of material having at least a predetermined minimum level providing a depth which on the lower end of the channel is deeper than the depth of material on the upper end thereof, a vibrator connected to the channel for shaking the material to advance material up the incline of the channel, a nuclear source of penetration radiation mounted adjacent one side of the channel to direct a beam of radiation at the material between the bottom of the channel and said minimum level at a location nearer the lower end than the upper end thereof, and a quantitative radiation detector mounted adjacent the side of the channel opposite the nuclear source for measuring the unabsorbed radiation passing through the material whereby the density of radiation signaled by the detector provides a measure of the bulk density of the material.

4. An apparatus for producing an operational control signal indicative of the density achieved by heating a mix of random size particles of a material that shrinks when heated, comprising a cooler, a multistage screening assembly connected to said cooler for screening the material to collect a sample of more uniform size pieces than found in the prescreened mix, an upwardly inclined channel connected to the discharge end of the screening assembly for collecting and establishing on the incline a layer of material having at least a predetermined minimum level providing a depth which on the lower end of the channel is deeper than the depth of material on the upper end thereof, a vibrator connected to the channel for shaking the material to advance material up the incline of the channel, a source of gamma rays mounted adjacent one side of the channel to direct a beam at the material between the bottom of the channel and said minimum level at a location nearer the lower end than the upper end thereof, a gamma ray density gauge mounted adjacent the side of the channel opposite the ray source for measuring the unabsorbed gamma rays passing through the material whereby the density of gamma rays signaled by the gauge provides a continuous measure of the bulk density of the material.

References Cited by the Examiner

UNITED STATES PATENTS

| | | | |
|---|---|---|---|
| 2,953,682 | 9/1960 | Frank | 250—43.5 |
| 3,064,357 | 11/1962 | Butters | 250—83.3 |
| 3,070,692 | 12/1962 | Ohmart et al. | 250—83.3 |

RALPH G. NILSON, *Primary Examiner.*

JAMES W. LAWRENCE, *Examiner.*

A. R. BORCHELT, *Assistant Examiner.*